(12) United States Patent
Russell (10) Patent No.: US 6,999,998 B2
(45) Date of Patent: *Feb. 14, 2006

(54) SHARED MEMORY COUPLING OF NETWORK INFRASTRUCTURE DEVICES

(75) Inventor: Lance W. Russell, Hollister, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 596 days.

This patent is subject to a terminal disclaimer.

(21) Appl. No.: 09/971,135

(22) Filed: Oct. 4, 2001

(65) Prior Publication Data

US 2003/0069938 A1    Apr. 10, 2003

(51) Int. Cl.
*G06F 15/167* (2006.01)

(52) U.S. Cl. .................... 709/213; 709/214; 709/217; 709/238; 709/242

(58) Field of Classification Search ............... 711/213, 711/147; 709/213, 214, 217, 238, 242
See application file for complete search history.

(56) References Cited

U.S. PATENT DOCUMENTS

| | | |
|---|---|---|
| 5,440,546 A | 8/1995 | Bianchini, Jr. et al. |
| 5,475,858 A | 12/1995 | Gupta et al. |
| 5,682,482 A | 10/1997 | Burt et al. |
| 5,802,320 A | 9/1998 | Baehr et al. |
| 5,832,503 A | 11/1998 | Malik et al. |
| 5,870,561 A | 2/1999 | Jarvis et al. |
| 5,872,928 A | 2/1999 | Lewis et al. |
| 5,889,953 A | 3/1999 | Thebaut et al. |
| 5,940,870 A | 8/1999 | Chi et al. |
| 5,987,506 A | 11/1999 | Carter et al. |
| 6,005,864 A | 12/1999 | Krause |
| 6,006,259 A | 12/1999 | Adelman et al. |
| 6,006,275 A | 12/1999 | Picazo, Jr. et al. |
| 6,021,132 A | 2/2000 | Muller et al. |
| 6,026,461 A | 2/2000 | Baxter et al. |
| 6,038,309 A | 3/2000 | Ram et al. |
| 6,041,347 A | 3/2000 | Harsham et al. |
| 6,047,322 A | 4/2000 | Vaid et al. |
| 6,078,957 A | 6/2000 | Adelman et al. |
| 6,078,994 A | 6/2000 | Carey |
| 6,101,543 A | 8/2000 | Alden et al. |
| 6,128,279 A | 10/2000 | O'Neil et al. |
| 6,128,654 A | 10/2000 | Runaldue et al. |

(Continued)

FOREIGN PATENT DOCUMENTS

WO    WO 00/30294    5/2000

(Continued)

OTHER PUBLICATIONS

Ian W. Marshall et al., "Adaptive management of an Active Service Network," BT Technology Journal, BT Laboratories, GB, vol. 18, No. 4, pp. 78-84 (2000).

(Continued)

*Primary Examiner*—Jack Lane
(74) *Attorney, Agent, or Firm*—Richard P. Lange (57) ABSTRACT

Described herein are systems and methods of coupling network infrastructure devices through a shared memory facility, rather than through conventional network I/O (input/output) adapters. All communications through the resulting network infrastructure service system are conducted using shared memory as the physical transport medium. In this way, the congestion and processing overhead caused by the duplication and storage of multiple copies of data packets to be transferred between network infrastructure devices may be avoided. This feature of the invention significantly increases the speed at which packets may be transmitted between network infrastructure devices.

3 Claims, 8 Drawing Sheets

U.S. PATENT DOCUMENTS

| | | | |
|---|---|---|---|
| 6,141,686 A | 10/2000 | Jackowski et al. | |
| 6,148,336 A | 11/2000 | Thomas et al. | |
| 6,154,796 A | 11/2000 | Kuo et al. | |
| 6,157,955 A | 12/2000 | Narad et al. | |
| 6,167,445 A | 12/2000 | Gai et al. | |
| 6,173,375 B1 | 1/2001 | Arshad | |
| 6,192,514 B1 | 2/2001 | Lurndal | |
| 6,226,788 B1 | 5/2001 | Schoening et al. | |
| 6,247,059 B1 | 6/2001 | Johnson et al. | |
| 6,272,522 B1 | 8/2001 | Lin et al. | |
| 6,393,474 B1 | 5/2002 | Eichert et al. | |
| 6,424,621 B1 * | 7/2002 | Ramaswamy et al. | 370/230 |
| 6,487,594 B1 | 11/2002 | Bahlmann | |
| 6,631,447 B1 * | 10/2003 | Morioka et al. | 711/141 |
| 6,678,827 B1 | 1/2004 | Rothermel et al. | |
| 2002/0091807 A1 * | 7/2002 | Goodman | 709/221 |
| 2002/0095595 A1 * | 7/2002 | Christopherson et al. | 713/200 |
| 2003/0023764 A1 * | 1/2003 | Reese et al. | 709/250 |
| 2003/0037178 A1 | 2/2003 | Vessey et al. | |
| 2003/0069939 A1 | 4/2003 | Russell | |
| 2003/0069949 A1 | 4/2003 | Chan et al. | |

FOREIGN PATENT DOCUMENTS

| | | |
|---|---|---|
| WO | WO 00/30321 | 5/2000 |
| WO | WO 00/30401 | 5/2000 |
| WO | WO 00/57286 | 9/2000 |
| WO | WO 01/14987 | 3/2001 |
| WO | WO 01/15393 | 3/2001 |
| WO | WO 01/16737 | 3/2001 |
| WO | WO 01/16742 | 3/2001 |
| WO | WO 01/16743 | 3/2001 |
| WO | WO 01/16750 | 3/2001 |
| WO | WO 01/27781 | 4/2001 |

OTHER PUBLICATIONS

Bernard Pagurek et al., "Management of Advanced Services in H.323 Internet Protcol Telephony, "Proc. IEEE INFOCOM 2000. Conf. on Computer Comm., PP. 91-100 (2000).

Zhang et al., "Developing network management applications in an application-oriented way using mobile agent," Computer Networks & ISDN Systems, 30:16-18, pp. 1551-1557 (1998).

US 6,014,703, 01/2000, McCrory et al. (withdrawn)

* cited by examiner

SHARED MEMORY COUPLING OF NETWORK INFRASTRUCTURE DEVICES

TECHNICAL FIELD

This invention relates, in general, to network infrastructure (or edge) devices and, in particular, to systems and methods of coupling network infrastructure devices through a shared memory facility.

BACKGROUND

In modern computer systems, computers may communicate with each other and with other computing equipment over various types of data networks. Routable data networks are configured to route data packets (or frames) from a source network node to one or more destination network nodes. As used herein, the term "routable protocol" refers to a communications protocol that contains a network address as well as a device address, allowing data to be routed from one network to another. Examples of routable protocols are SNA, OSI, TCP/IP, XNS, IPX, AppleTalk, and DECnet. A "routable network" is a network in which communications are conducted in accordance with a routable protocol. One example of a routable network is the Internet, in which data packets are routed in accordance with the Internet Protocol (IP). In a routable data network, when a network routing device (or router) receives a data packet, the device examines the data packet in order to determine how the data packet should be forwarded, if at all. Similar forwarding decisions are made as necessary at one or more intermediate routing devices until the data packet reaches a desired destination node.

Network infrastructure services have been developed for monitoring, managing and manipulating traffic through a network. In general, network infrastructure services may be classified as security services (e.g., firewall, proxy and intrusion detection services), quality of service services (e.g., load balancing), or network management services (e.g., application level management and active network management services). These services conventionally are implemented as one or more software modules executing on general-purpose computers, in hardware, firmware or software operating in single-function (or dedicated) devices, or in software or firmware operating on switches and routers. A general-purpose computer typically provides a complete operating environment for network infrastructure applications, including all of the services provided by the operating system and application program interfaces for communicating with the operating system. New network infrastructure applications may be loaded and, generally, existing network infrastructure applications may be updated on a general-purpose computer simply by loading the new application or application update. However, the performance (e.g., bandwidth, latency, interrupt response time, and processing speed) of general-purpose computers typically is not optimized for running network infrastructure applications. In contrast, the performance of a dedicated device typically is optimized for providing a particular network infrastructure service. Although the operating characteristics of a dedicated device generally may be changed simply by loading a new configuration file into a dedicated device, the service functionality of a dedicated device typically cannot be changed. Thus, a new dedicated device usually is needed for each new network infrastructure service that is to be implemented in the network.

In sum, in terms of network infrastructure service management, general-purpose computers provide the greatest flexibility and the lowest performance, whereas dedicated devices typically provide the highest performance and the least flexibility. The flexibility and performance characteristics of routers and switches generally fall somewhere between the corresponding characteristics of general-purpose computers and dedicated devices.

To address some of these issues, U.S. Pat. No. 6,157,955 has proposed a general-purpose programmable packet-processing platform for accelerating network infrastructure applications that have been structured to separate the stages of classification and action. According to the Abstract of this patent:

Network packet classification, execution of actions upon those packets, management of buffer flow, encryption services, and management of Network Interface Controllers are accelerated by a multiplicity of specialized modules. A language interface is defined for specifying both stateless and stateful classification of packets and to associate actions with classification results in order to efficiently utilize these specialized modules.

SUMMARY

The invention features systems and methods of coupling network infrastructure devices through a shared memory facility rather than through conventional I/O (input/output) adapters. All communications through the resulting network infrastructure service system are conducted using shared memory as the physical transport medium. In this way, the congestion and processing overhead caused by the duplication and storage of multiple copies of data packets to be transferred between network infrastructure devices may be avoided. This feature of the invention significantly increases the speed at which packets may be transmitted between network infrastructure devices. In addition, the invention provides an interface that makes the shared memory facility appear to application programs as a regular network. Thus, application programs may use the shared memory facility without having to be re-coded.

In one aspect, the invention features a system providing network infrastructure services. The system comprises a shared memory facility interconnecting a plurality of network devices each configured to perform a dedicated network infrastructure function.

Embodiments of the invention may include one or more of the following features.

In some embodiments, the dedicated network infrastructure function is selected from the group consisting of: a network security function, a quality of service function, and a network management function. In these embodiments, the dedicated network infrastructure function may be a proxy function, a load balancing function, a memory caching function, an encryption function, a compression function, a re-routing function, an application level network management function, or an active network management function.

The shared memory facility may be a global shared memory facility, a distributed shared memory facility, or a logically shared memory facility.

In some embodiments, each network device is operable to perform only a single network infrastructure function.

In other embodiments, each network device is configurable and comprises a local processor and a local memory. In these embodiments, each network device preferably includes in local memory an application module that is operable to control the functionality of the network device, and a configuration file containing parameters controlling operating characteristics of the network device. Each network device also may include a kernel that is operable to provide basic services to the network device. The dedicated network infrastructure function that is performed by a network device may be dynamically configurable. The dedicated network infrastructure function that is performed by a network device may be selected based upon a network management policy.

In some embodiments, each network device includes a local communications protocol stack, and a shared memory interface system. The shared memory interface system is operable to provide a local shared memory network between the network devices, and a global shared memory network between the network devices and one or more remote nodes by capturing packets from the local communications protocol stacks and routing the captured packets over the shared memory facility. The shared memory interface system on each local node may comprise a local shared memory virtual adapter and a global shared memory virtual adapter. The local shared memory virtual adapters are operable to capture locally addressed packets from the local communications protocol stacks and to route the captured packets for physical transport over the shared memory facility. The global shared memory virtual adapters are operable to capture globally addressed packets from the local communications protocol stacks and to route the captured packets for physical transport over the shared memory facility. The local shared memory virtual adapters preferably appear to the local communications protocol stacks as device drivers for physical network adapters that are connected to the local shared memory network. The global shared memory virtual adapters preferably appear to the local communications protocol stacks as device drivers for physical network adapters that are connected to the global shared memory network.

The global shared memory network allows all of the local nodes to be addressed by a single network address. In this way, packets may be diverted from one node to another in a manner that is transparent to remote client nodes (e.g., a remote client node does not have to explicitly make a connection to a local node that is actually servicing the remote client node). The local shared memory network enables local network device nodes to communicate over shared memory using conventional network software. In addition, the local shared memory network enables each local device to be addressed uniquely through a local shared memory network address.

In another aspect, the invention features a method of providing network infrastructure services that comprises interconnecting through a shared memory facility a plurality of network devices each configured to perform a dedicated network infrastructure function.

In another aspect of the invention, a computer program residing on a computer-readable medium comprises computer-readable instructions for causing a computer system to interconnect through a shared memory facility a plurality of network devices each configured to perform a dedicated network infrastructure function.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
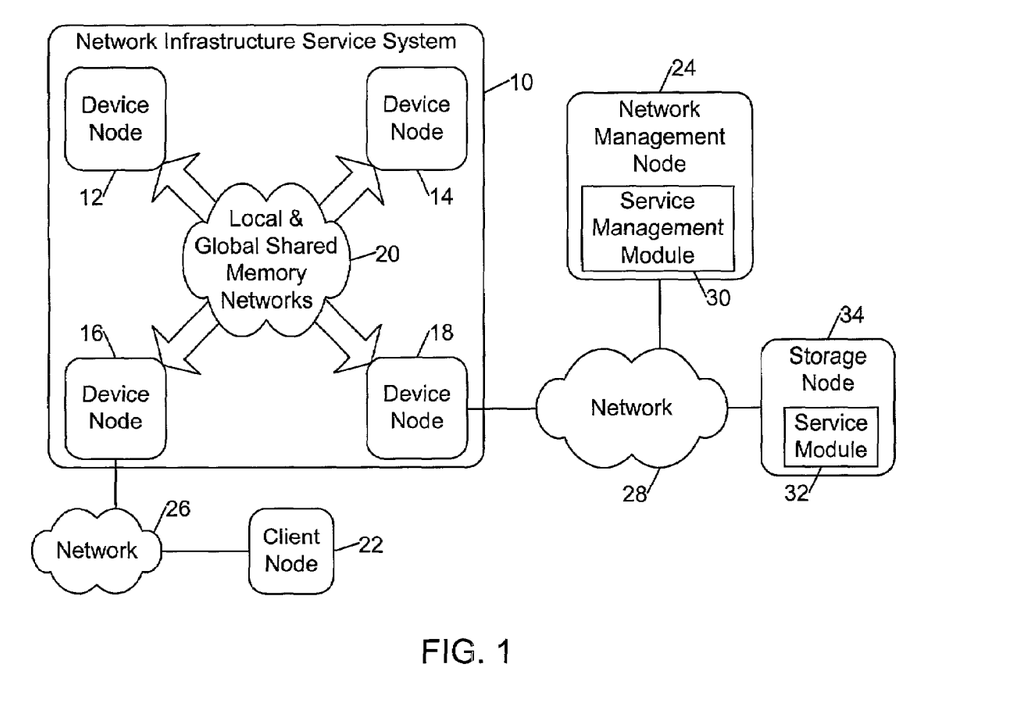
FIG. 1 is a block diagram of a network infrastructure service system, which includes a local shared memory network and a global shared memory network, and a network management node and a storage node that are connected to the network infrastructure service system by two external networks.

Referring to FIG. 1, in one embodiment, a network infrastructure service system 10 includes a plurality of device nodes 12, 14, 16, 18 that are interconnected by a shared memory facility 20 on which a local shared memory network and a global shared memory are constructed. Each device node 12–18 includes a network infrastructure (or edge) device whose functionality and operating characteristics may be reconfigured. A remote client node 22 and a network management node 24 may connect to network infrastructure service system 10 over a respective external network 26, 28. Remote client node 22 and network management node 24 each may be implemented as a single computer system or a multi-computer system having nodes that are interconnected to form a network. In multi-computer system embodiments, the component systems of remote client node 22 and network management node 24 may be implemented in one or more whole computer systems.

Remote client node 22 and network management node 24 each includes conventional network interfaces (not shown) that provide electronic and communication interfaces to external networks 26, 28. External networks 26, 28 each may be implemented as a LAN or a WAN. External networks 26, 28 may be connected to remote client nodes 22 and network management node 24 by conventional network routers (not shown). External networks 26, 28 may be of the same or different types. For example, external network 26 may be an ATM (Asynchronous Transfer Mode) network and external network 28 may be an Ethernet network. In addition, external networks 26, 28 may have different performance characteristics from one another. For example, external networks 26, 28 may have different load conditions, transmission characteristics, and maximum transmission unit (MTU) sizes (i.e., the largest packet sizes that can be transmitted over the networks).

Communications with network infrastructure service system 10 are conducted in accordance with a routable communications protocol (e.g., TCP/IP, SNA, OSI, XNS, IPX, AppleTalk, and DECnet). In the illustrated embodiment, network communications with network infrastructure service system 10 are described in accordance with the TCP/IP protocol. Accordingly, network infrastructure service system 10, remote client node 22, network management node 24, and external networks 26, 28 each are assigned a unique IP address. Any additional network nodes (e.g., routers) that are distributed along the routes between remote client node 22, network management node 24, and network infrastructure service system 10 also are assigned a respective IP address.

As explained in detail below, network management node 24 may access device nodes 12–18 individually or they may access network infrastructure service system 10 as a single, unified computing resource in accordance with a standard routable network communication protocol. In addition, each of the device nodes 12–18 may access another device node 12–18 or network management node 24 in accordance with the same standard routable network communication protocol; even device nodes that are not physically connected to external networks 26, 28 may access remote client node 22 and network management node 24 over one of the shared memory networks. All communications through network infrastructure service system 10 may be conducted using shared memory as the physical transport medium. In this way, the congestion and processing overhead caused by the duplication and storage of multiple copies of data packets in non-shared-memory communications networks may be avoided.

As explained in detail below, network management node 24 includes a service management module 30 that is configured to deploy network infrastructure services across network infrastructure service system 10 by causing each network device 12–18 to receive a network infrastructure service module 32 that may be stored at a storage node 34. Each network infrastructure service module 32 may be loaded by a respective network device 12–18 to implement a particular network infrastructure service function. For example, in one illustrative network infrastructure service deployment, device nodes 12, 14 may be configured to perform load balancing functions, and device nodes 16, 18 may be configured to perform firewall functions. Other network infrastructure service deployments are possible. The resources of each network device 12–18 are allocated to perform a single network infrastructure service function at any given time. In addition, each network device 12–18 may be reconfigured to perform a different network infrastructure function simply by loading a different network infrastructure service module 32. In this way, network infrastructure services may be deployed rapidly and flexibly in accordance with a selected network management policy, while substantially maintaining the performance advantages provided by dedicated-function network devices. In addition, because the network infrastructure services are deployed from a centralized source, the distributed network devices 12–18 may be synchronized and reconfigured in a coherent and efficient way.

Figure 2:
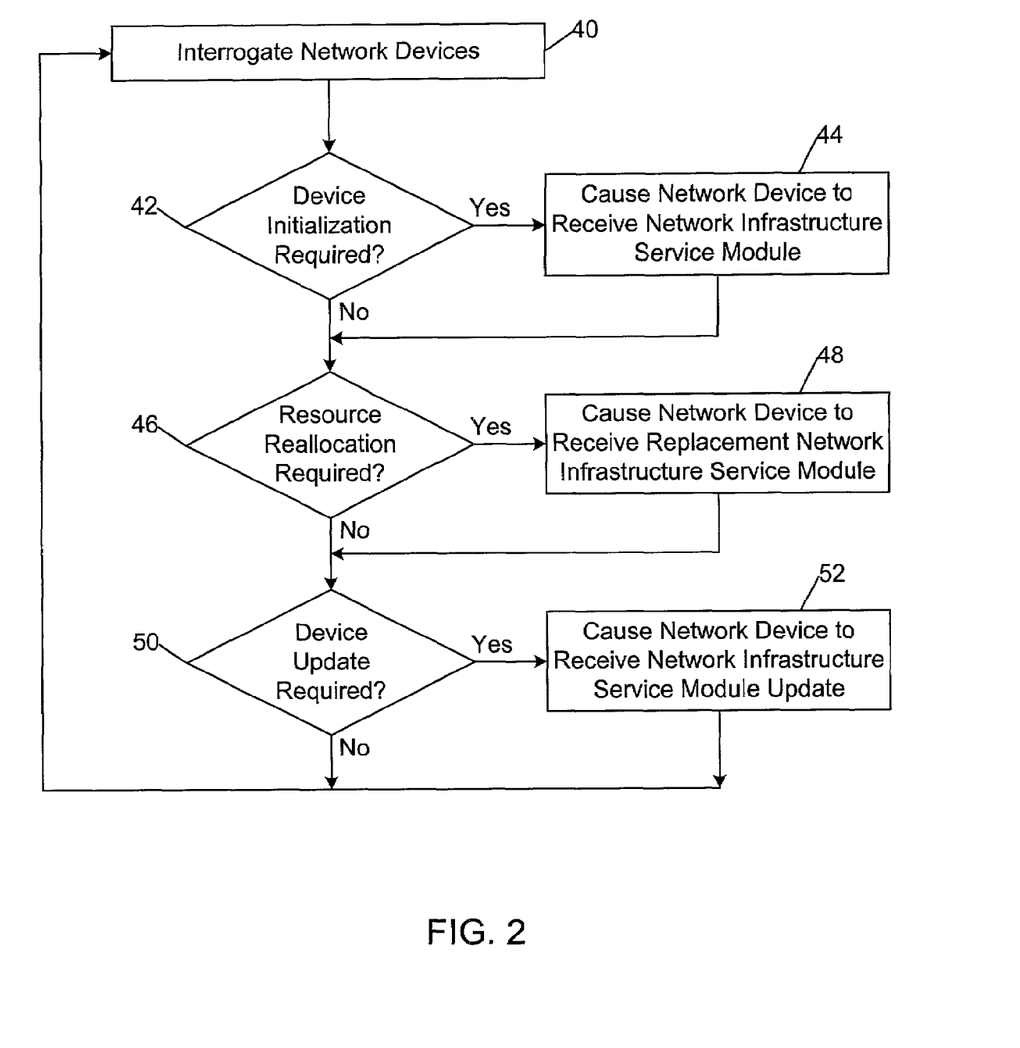
FIG. 2 is a flow diagram of a method of managing a plurality of network infrastructure services that are provided by the network infrastructure service system of FIG. 1.

Referring to FIG. 2, in one embodiment, service management module 30 may manage a plurality of network infrastructure services that are provided by network infrastructure service system 10 as follows. Service management module 30 interrogates network devices 12–18 to determine the status of the network devices 12–18 and to obtain statistics about network traffic flowing through the network devices 12–18 (step 40). Communication between service management module 30 and network devices 12–18 may be in accordance with a simple network management protocol (SNMP), a common open policy service (COPS) protocol, or some other agreed-upon protocol. Based upon this information, service management module 30 determines whether a network device initialization is required (e.g., because there is a new device, or a device has transmitted an initialization request, or a device has failed) (step 42). If a network device initialization is required (step 42), service management module 30 causes a selected network infrastructure service module 32 to be received by the network devices to be initialized (step 44). The network infrastructure service modules 32 may be disseminated to the network devices 12–18 in accordance with a push-type or a pull-type transmission model. The network infrastructure service modules 32 may be selected based upon a network management policy (e.g., a user priority policy, a type of service policy, a congestion control policy, a service level policy, or an allocation of resources policy). In addition, service management module 30 determines whether resources should be reallocated in order to optimize the performance of the network under current network conditions (step 46). If a resource reallocation is required (step 46), service management module 30 causes a replacement network infrastructure service module 32 to be received by one or more of the network devices 12–18 to change their functionality or their operating characteristics, or both (step 48). Service management module 30 also determines whether the network infrastructure service modules 32 loaded onto one or more of the network devices 12–18 should be updated (step 50). If a device update is required (step 50), service management module 30 causes updated network infrastructure service modules 32 to be received by the network devices 12–18 to be updated (step 52). Service management module 30 periodically interrogates the next network devices 12–18 (step 40), and repeats the above-described service management process (steps 42–52).

General Operating Environment of the Shared Memory Networks

Figure 3:
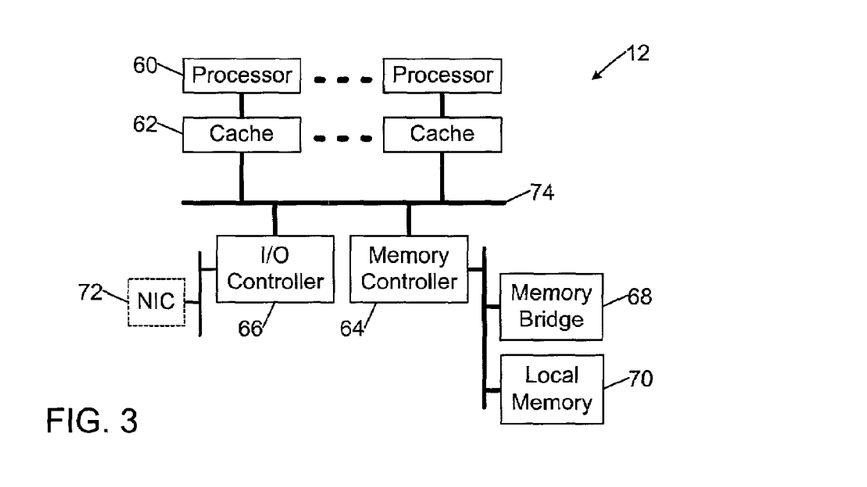
FIG. 3 is a block diagram of components of a device node of the network infrastructure service system of FIG. 1.

Referring to FIG. 3, in one embodiment, although each network device 12–18 may have a different overall architecture, these devices share a common core component structure that includes one or more processors 60 with associated caches 62, a memory controller 64, and an input/output (I/O) controller 66. The memory controller 64 is connected to a memory bridge 68 and a local memory 70. The input/output (I/O) controller 66 may be connected to one or more network interface cards (NICs) 72, which provide physical connections to external networks 26, 28.

The processors 60 communicate with memory controller 64 and I/O controller 66 over a memory (or system) bus 74, which may be compatible with any of a variety of bus protocols, including PCI, VESA, Microchannel, ISA, and EISA. Memory bridge 68 provides a coherent physical layer interconnecting the memory busses of device nodes 12–18 to form a virtual computer system. Memory controller 64 controls the flow of data between processors 60 and the local memory 70 and remote memory (i.e., memory residing on another device node). In this architecture, if a processor 60 requests data that is not in cache 62 or in local memory 70, memory controller 64 retrieves the data from a remote memory through memory bridge 68. Memory controller 64 may include bus-snooping protocols and other intelligence to maintain cache coherence. For example, memory controller 64 may communicate with the memory controllers of other device nodes in accordance with a standard cache coherence protocol (e.g., the ANSI/IEEE Scalable Coherent Interface protocol (SCI)) that provides shared memory across device nodes 12–18.

Figure 4:
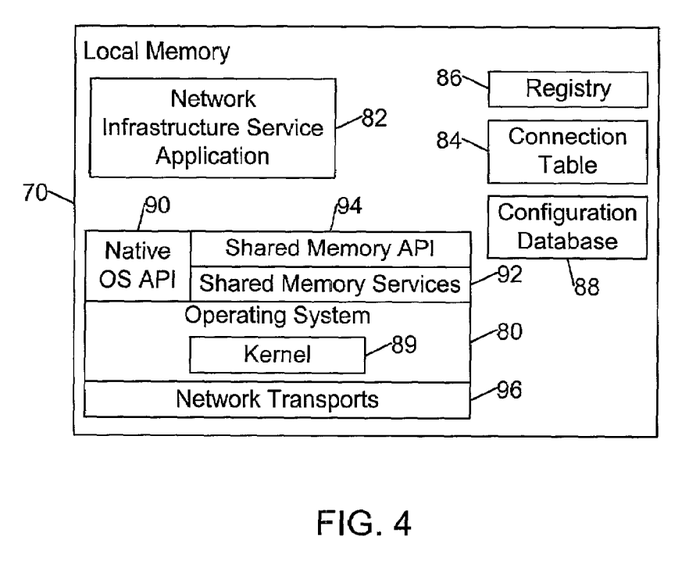
FIG. 4 is a diagrammatic view of an execution environment provided by the device node of FIG. 3.

As shown in FIG. 4, a number of program modules may be stored in the local memory 70 of each device node 12–18, including an operating system 80 (e.g., the Windows NT® operating system available from Microsoft Corporation of Redmond, Wash. U.S.A.) and a network service application program 82. Program data, such as a connection table 84, a registry (or configuration database) 86, and a configuration database 88 also may be stored in local memory 70. Operating system 80 includes a kernel 89 that provides the base operating system services (e.g., memory management, process and thread management, security, input/output, and interprocess communication) for creating a run-time execution environment on a device node 12–18. The registry 86 contains the following information: parameters needed to boot and configure the system; system-wide software settings that control the operation of operating system 80; a security database; and per-user profile settings. A native operating system (OS) application programming interface (API) 90 exposes the base operating system services of the executive to network service application program 82 and to one or more shared memory services (or services modules) 92. As used herein, the term "service" (or "service module") refers to a component of an operating system that provides a set of one or more functions. The shared memory service modules 92 are device drivers that may be configured to start automatically at system boot time without requiring an interactive logon; they also may be controlled dynamically during run-time. The shared memory service modules 92 call certain base operating system services (or functions) to interact with a service controller; such functions may include registering a successful startup, responding to status requests, and pausing or shutting down the service. The service controller starts, manages and directs operations within the service modules 92. The shared memory service modules 92, on the other hand, create the environment in which one or more processes may operate and control the start-up, maintenance and termination of such processes. The shared memory service modules are designed to configure the shared memory facility to look like a conventional transport medium and make it available to networking applications. In this way, networking applications do not have to be re-coded before using a shared memory connection.

Typically, the run-time execution environment is installed on a device node 12–18, and network infrastructure service application program 82 may access the functionality provided by the shared memory service modules 92 through a shared memory API 94. The shared memory modules, however, allow the application programs 52 to access the functionality provided by the shared memory service modules 60 without being recorded to a shared memory API. Instead, application programs simply may use existing networking APIs. Before a shared memory service module 92 may operate in the run-time execution environment, it must be installed on a device node 12–18. A shared memory service module 92 typically is installed by storing the shared memory service module 92 in a data storage area that is accessible by a device node 12–18, and registering the attributes of the service module 92 in the registry 86. Further details about the Windows NT® operating system may be obtained from "Inside Windows NT," Second Edition, David A. Solomon, Microsoft Press (1998), which is incorporated herein by reference.

The kernel 89, the network infrastructure service application 82, and the configuration database 88 may be encapsulated into a network infrastructure service module 32 that may be obtained from storage node 34. Configuration database 88 may contain parameters needed to boot and configure the network devices 12–18, and system-wide software settings that control the operation of operating system 80. Network infrastructure service application 82 provides the specific network infrastructure function to be performed by the network devices 12–18. The function may be, for example, a proxy function, a load balancing function, a memory caching function, an encryption function, a compression function, a re-routing function, an application level network management function, or an active network management function. Each of these functions may be implemented as one or more conventional network infrastructure service software programs.

Each network device 12–18 may perform additional network functions, such as monitoring and collecting information relating to network traffic flowing through the network devices 12–18. This information may be stored in memory local memory 70 for retrieval by service management module 30. This additional functionality may be enabled by loading one or more corresponding service modules into the network devices.

Network infrastructure service module 32 may be loaded by a network device 12–18 at boot-up or dynamically. At boot-up, the network devices 12–18 may obtain service module 32 by transmitting an initialization request to service management module 30. In response to the initialization request, service management module 30 may reply by returning either a selected network infrastructure service module 32 or an identifier with which the network device 12–18 may retrieve the selected network infrastructure service module 32 from storage node 34. Depending upon the particular implementation and the particular network infrastructure management task to be performed, some or all of the components of network infrastructure service module 32 may be transmitted to a network device 12–18. For example, all of the components of the network infrastructure service module 32 may be transmitted to a network device 12–18 to initialize or change the functionality of the network device 12–18. Alternatively, only the configuration database 88 may be transmitted to a network device 12–18 to update the operating parameters of the network device 12–18.

A shown in FIG. 4, the execution environment stored in local memory 70 also includes a set of network transport protocols 96. In the illustrated embodiment, communications over the local and global shared memory networks are conducted in accordance with the Transmission Control Protocol/Internet Protocol (TCP/IP). The TCP portion of the protocol provides the transport function by breaking a message into smaller packets, reassembling the packets at the other end of the communication network, and re-sending any packets that get lost along the way. The IP portion of the protocol provides the routing function by assigning to the data packets addresses for the destination network and the target node at the destination network. Each data packet that is communicated using the TCP/IP protocol includes a header portion that contains the TCP and IP information. The IP protocol provides no guarantee of packet delivery to the upper layers of the communications stack. The TCP protocol, on the other hand, provides a connection-oriented, end-to-end transport service with guaranteed, in-sequence packet delivery. In this way, the TCP protocol provides a reliable, transport layer connection. In other embodiments, communications over the local and global shared memory networks may be conducted in accordance with the User Datagram Protocol/Internet Protocol (UDP/IP). UDP may be used in place of TCP in conditions when a reliable delivery is not required. For example, UDP/IP is often used for real-time audio and video traffic where lost data packets are simply ignored, because there is no time to retransmit. Gateways may be used to convert into a TCP/IP (or UDP/IP) format data packets that are received from external networks using different protocols. The execution environment also includes hardware link level and access protocols, which may correspond to the Data link and Physical layers of the Open System Interconnection (OSI) reference model.

At system start up, each device node 12–18 must determine an IP address for each of its network interfaces before it may communicate using TCP/IP. For example, a device node 12–18 may need to contact a server to dynamically obtain an IP address for one or more of its network interfaces. The device node 12–18 may use a Dynamic Host Configuration Protocol (DHCP) to issue a request for an IP address to a DHCP server. For example, a DHCP module broadcasts a DHCP request packet at system start up requesting allocation of an IP address for an indicated network interface. Upon receiving the DHCP request packet, the DHCP server allocates an IP address to the requesting device node 12–18 for use with the indicated network interface. The requesting device node 12–18 then stores the IP address in the response from the server as the IP address to associate with that network interface when communicating using TCP/IP.

General Architecture of the Shared Memory Networks

As mentioned above, two shared memory networks are created: (1) a local shared memory network supporting traditional node specific addresses; and (2) a global shared memory network supporting global node addresses. In this way, device nodes 12–18 may communicate through standard network interfaces while using shared memory as the physical transport medium. Over the local shared memory network, network infrastructure service system 10 may be addressed externally and internally as individual nodes. This feature enables applications to have particular node affinities (such as hardware affinities), and enables distributed processing within the network infrastructure service system partition. Over the global shared memory network, network infrastructure service system 10 may be addressed externally and internally as a single node. This feature enables the system to be used as a single, unified computing resource and reduces system administration and client application development overhead.

In general, the local shared memory network and the global shared memory network have the following characteristics:

Packet delivery is unreliable. The software that is designed for these networks can an will drop packets. The applications and communications protocols (e.g., TCP) are relied upon to insure reliability.

Each packet is treated as an autonomous unit of data. The local shared memory network maintains no knowledge of connections or associations. The global shared memory network maintains knowledge of connections and associations, but only maintains minimal state information.

Data delivery between device nodes 12–18 is guaranteed to be in order.

Figure 5:
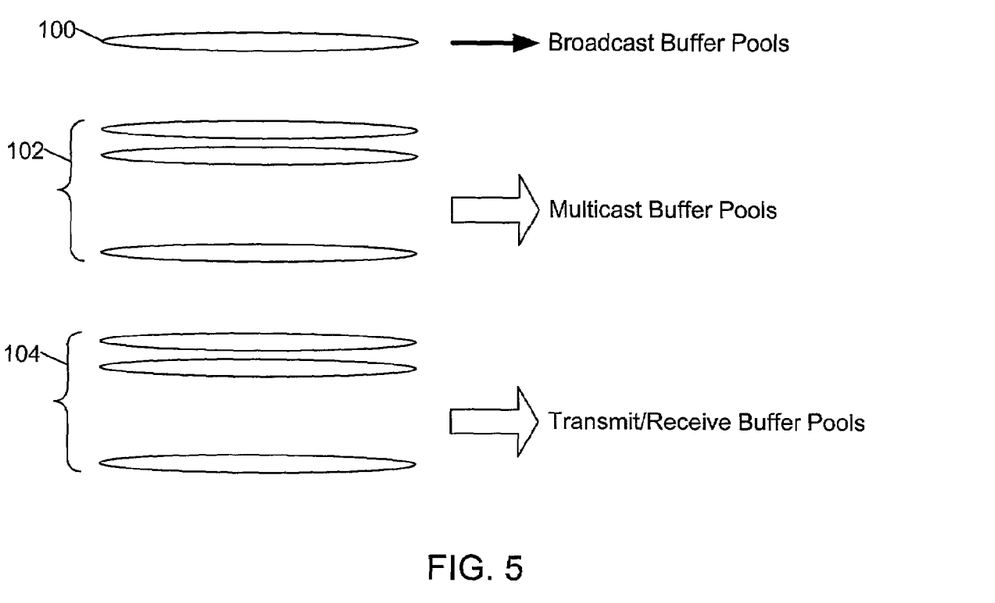
FIG. 5 is a diagrammatic view of a plurality of ring structures that are allocated in shared memory to implement the local and global shared memory networks of FIG. 1.

Referring to FIG. 5, in one embodiment, for each of the local and global shared memory networks a number of shared memory rings are created. In particular, for each shared memory network, the following structures are allocated in global shared memory: (1) one broadcast ring 100 per system partition; (2) a configurable number of multicast rings 102; and (3) a pair of transmit/receive rings 104 between each pair of device nodes 12–18 (i.e., for a four-node network infrastructure service system 10, twelve transmit/receive rings are created). In some embodiments, each of the shared memory rings corresponds to a respective pool of a fixed number of scribble buffers (or slots) in global shared memory. In other embodiments, the buffer pools may have variable lengths, and a linked list reconstruction algorithm may be used to reconstruct the pools in the event of failure. Each pool slot is a data buffer having a size of approximately one MTU. In the illustrated embodiment, the MTU may range in size from 1,490 bytes to 65,536 bytes. The MTU size is a configurable parameter for each of the local and global shared memory networks. By making the MTU flexible and configurable network administrators may match the MTU to the physical media connecting the system to the outside world. In some embodiments, multiple shared memory networks may be created with different MTUs. In this way, traffic may be partitioned to take the most efficient path. For example, traffic between the devices utilizing shared memory may travel a link with the largest possible MTU (e.g., 65,536 bytes). Traffic destined to an outside Ethernet, on the other hand, may be directed onto a shared memory network link with a 1,500 byte MTU. Packets on this link may be shaped to this MTU without having to be fragmented when they reach the node that must put the packets on the physical Ethernet.

Figure 6A:
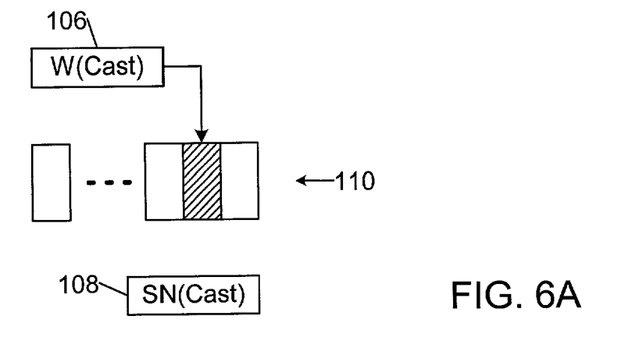
FIG. 6A is a diagrammatic view of a buffer pool, an associated pointer, and a sequence number that are allocated for each of the multicast and broadcast rings supported by the network infrastructure service system of FIG. 1.

As shown in FIG. 6A, in one embodiment, a write pointer (W(Cast)) 106, which indicates the next slot to which to write, and a slot sequence number (SN(Cast)) 108 are associated with broadcast/multicast buffer pool 110. Each multicast pool also has an associated memory area that labels the multicast address of the pool. In operation, broadcast ring 100 receives all broadcast packets from all of the device nodes 12–18, and each multicast ring 102 receives all multicast packets that are addressed to its respective multicast address. Each of the broadcast ring 100 and the multicast rings 102 has a configurable fixed depth, which translates into a fixed number of packet slots. Each of the broadcast ring 100 and the multicast rings 102 is allocated at a respective known global address by the first device node that tries to place a packet in the broadcast ring or one of the multicast rings. Each of the broadcast ring 100 and the multicast rings 102 is synchronized in accordance with a ticker tape mutual exclusion locking algorithm in which writes are serialized by locks in global shared memory, reads are not serialized, and writers are not blocked for readers but are forced into the "stale" slot.

Figure 6B:
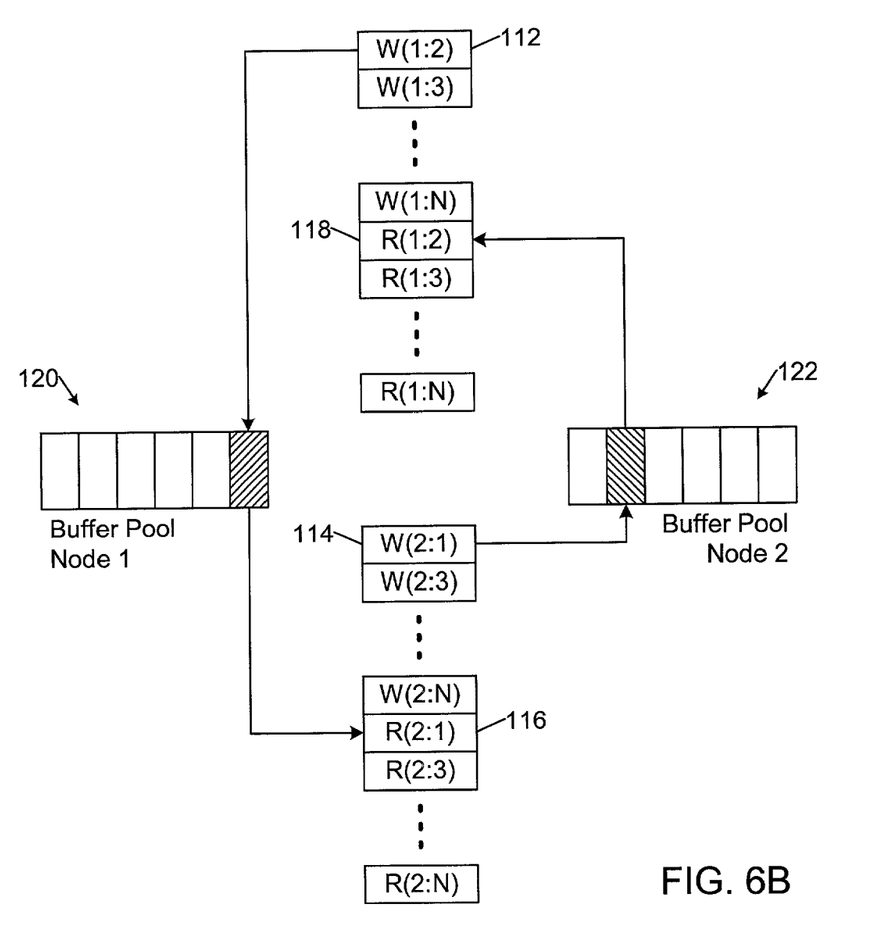
FIG. 6B is a diagrammatic view of a pair of transmit/receive buffer pools and associated read and write pointers that are allocated for communications between a pair of device nodes of the network infrastructure service system of FIG. 1.

As shown in FIG. 6B, in one embodiment, a write pointer (W(transmitting node a: receiving node b)) 112, 114 and a read pointer (R(transmitting node a: receiving node b)) 116, 118 are associated with each of the transmit/receive buffer pools 120, 122 that are allocated between each pair of device nodes 12–18. Each of the transmit/receive rings 104 is configured for unidirectional transfer of data between a pair of device nodes 12–18. The write and read pointers 112–118 are located in global shared memory. In some embodiments, the write pointers 112, 114 are completely under the control of the transmitting nodes, and the read pointers are completely under the control of the receiving nodes. In these embodiments, local memory locks protect the read and write pointers 112–118. In other embodiments, a global lock may be used to serialize access to the transmit/receive buffer pools 120, 122. In operation, when a writer transmits a packet, a pool slot is filled, the write pointer 112, 114 is incremented, and the receiving node is notified by the generation of an interrupt at the receiving node. At the receiving node, a pool slot is emptied and the read pointer 116, 118 is incremented. There is no "join" processing on the local shared memory network or the global shared memory network. Instead, nodes are discovered when they place a packet in the broadcast pool. When this occurs, each active node connects the pre-allocated receive ring on the discovered node from transmit. These rings are guaranteed to be allocated before processing is initiated on a node. When a node on the local shared memory network fails, the transmit rings into the failed node are marked down and, in the general case, all access to the failed node's shared memory ceases. If the failed node allocated the broadcast pool or any multicast pools, these pools are reallocated on another device node.

Figure 7:
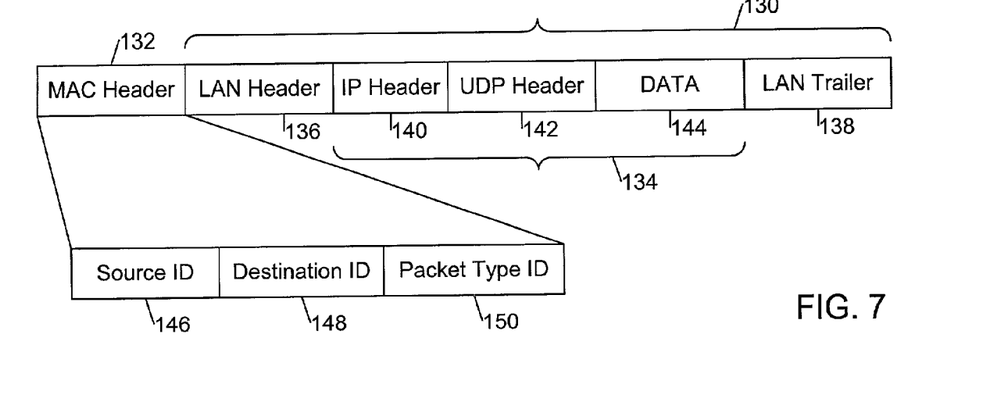
FIG. 7 is a diagrammatic view of a communication packet that includes a media access control (MAC) header for implementing the local and global shared memory networks of FIG. 1.

Referring to FIG. 7, in one embodiment, each packet message that is placed on the local shared memory network or the global shared memory network is encapsulated as a LAN packet 130 that is prefixed by a shared memory MAC header 132. In another embodiment, each message packet may not be encapsulated in a LAN packet with IP and TCP/UDP headers. Instead, these message packets may be presented directly to other local devices, and protocol (e.g., IP/TCP/UDP) processing is performed only once on the receiving node. The LAN packet 130 includes an Internet packet 134 that is sandwiched between a LAN header 136 and a LAN trailer 138. IP packet 134 includes an IP header 140, a UDP header 142, and a data area 144. As shown in FIG. 7, the shared memory MAC header 132 includes a source identifier 146, a destination identifier 148, and a packet type identifier 150. Source identifier 146 has a size of six bytes, and for non-cast packets, the last two bytes correspond to the source node ID, which may be used by the virtual network adapters (described below) for routing packets to the appropriate shared memory buffer pools. Destination identifier 148 has a size of six bytes, and for non-cast packets, the last two bytes correspond to the destination node ID, which may be used by the virtual network adapters (described below) for routing packets to the appropriate shared memory buffer pools. Packet type identifier 150 has a size of two bytes and corresponds to the packet type identifiers used for IEEE standard 802.3 CSMA/CD local area networks. The packet type identifier 150 may be used for multi-protocol packet multiplexing.

As mentioned above, in one embodiment, the local shared memory network and the global shared memory network are implemented in software by shared memory virtual adapters that are configured to appear to user application programs as standard hardware network interfaces. Data transmissions over the local and global shared memory networks are passed through the shared memory virtual adapters, which control the routing of packets through the shared memory facility 20. Each network adapter registers with the network layer in the TCP/IP (or UDP/IP) stack that it is able to reach IP addresses of interfaces within the local shared memory network or the global shared memory network. In this way, packets received by the TCP/IP (or UDP/IP) stack that are addressed for delivery over the local shared memory network or the global shared memory network will be passed by the TCP/IP (or UDP/IP) stack to the appropriate shared memory virtual adapters. The shared memory virtual adapters, in turn, encapsulate the data packets in suitably addressed data frames and pass the data frames back to the TCP/IP (or UDP/IP) stack to be sent to the correct physical address through the shared memory facility 20 or through a physical network adapter 72.

Figure 8A:
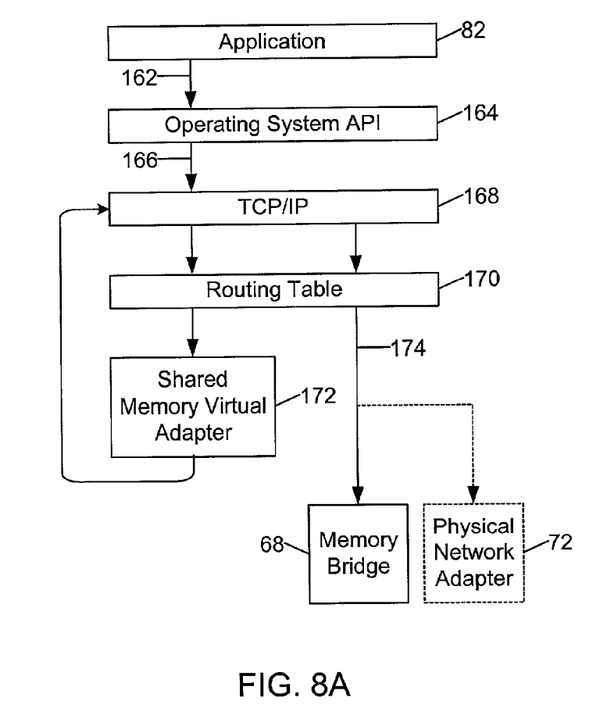
FIG. 8A is a diagrammatic view of packet flow from an application program to a network connection through multiple communication layers, including a shared memory virtual adapter.

Referring to FIG. 8A, network infrastructure service application 82 may transmit data 132 to be sent over the local shared memory network or the global shared memory network, as follows. Initially, network infrastructure service application 82 transmits data 162 through the operating system API 164. The operating system API 164 converts the received data 162 into data packets 166 in accordance with the TCP/IP (or UDP/IP) protocol by adding the LAN header 166 and the LAN trailer 168, the IP header 140, and the UDP header 142. The operating system API 164 transmits the data packets 166 to the TCP (or UDP) layer of the TCP/IP (or UDP/IP) protocol stack 168. The TCP (or UDP) layer passes the data packets 166 to the IP layer, which refers to a routing table 170 to determine which network interface should be used to reach the destination IP address. The IP layer determines from the routing table 170 that the destination IP address corresponds to a local shared memory network node or a global shared memory network node and, therefore, passes the data packets to an appropriate shared memory virtual adapter 172. The shared memory virtual adapter 172 encapsulates the received data packets into appropriately addressed data frames, each prefixed with a shared memory MAC header 132, and passes the data frames back to the TCP/IP (or UDP/IP) protocol stack 168. The TCP layer forms a TCP layer packet 174 for each data frame, with the data frame as its data. The IP layer consults the routing table 170 and, based upon the routing table entries, routes the TCP layer packets 174 to global shared memory through memory bridge 68 or to external network 28 through physical network adapter 72.

Figure 8B:
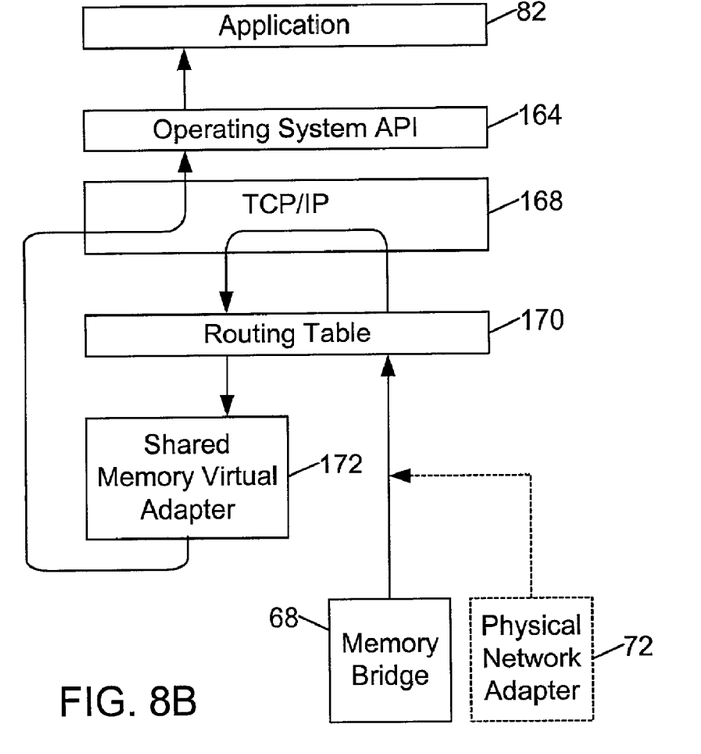
FIG. 8B is a diagrammatic view of packet flow from a network connection to an application program through multiple communication layers, including a shared memory virtual adapter.

Referring to FIG. 8B, data packets that are addressed for the local shared memory network or the global shared memory network and received through memory bridge 68 or physical network adapter 72 may be transmitted to network infrastructure service application 82, as follows. Initially, data arrives over a physical network and is received by either memory bridge 68 or physical network adapter 72 and passed to a physical network driver. The physical network driver passes the data through the IP layer of the TCP/IP (or UDP/IP) protocol stack 168, which in turn passes the data to shared memory virtual adapter 172 based upon an entry in routing table 170. Shared memory virtual adapter 172 strips off the MAC header 132 and passes the data back to the IP layer of the TCP/IP (or UDP/IP) protocol stack 168. The data is then passed through the TCP/IP (or UDP/IP) protocol stack 168 and the operating system API 164 to the user application 160.

Figure 9:
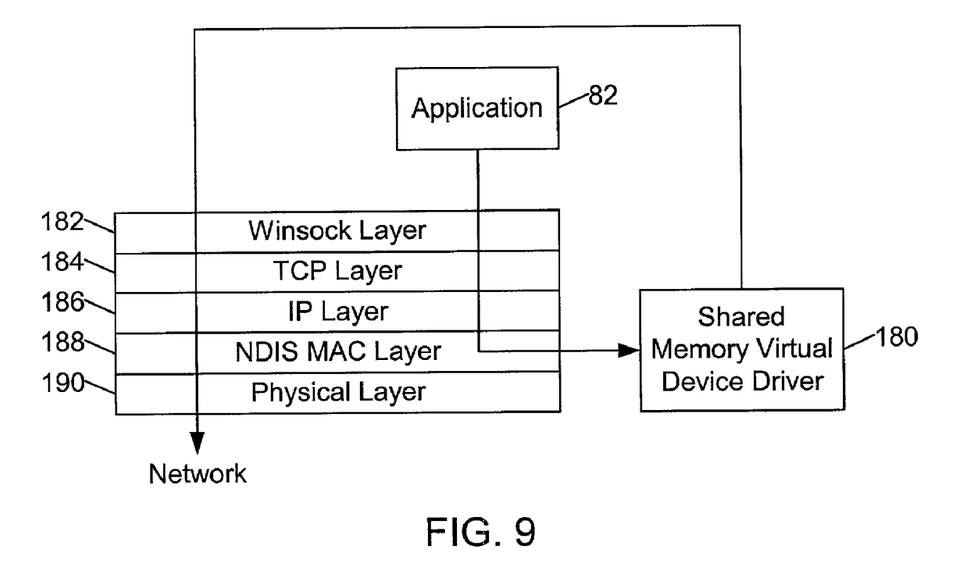
FIG. 9 is a diagrammatic view of packet flow through communication layers in a Microsoft Windows NT® execution environment.

Referring to FIG. 9, in one embodiment, the shared memory virtual adapters are implemented as Network Device Interface Specification (NDIS) MAC intermediate drivers 180 for use in the Microsoft Windows NT® operating environment. In this embodiment, the shared memory virtual adapters appear to the TCP/IP (or UDP/IP) protocol stack as an Ethernet physical adapter. In this embodiment, network service application 82 passes data to a WinSock layer 182 that interfaces with the TCP (or UDP) layer 184 of the TCP/IP (or UDP/IP) protocol stack. The network service application 82 also passes a destination IP address that is associated with a node on the local shared memory network or the global shared memory network and is accessible through a shared memory virtual adapter 172. The TCP (or UDP) layer 184 passes the data to the IP layer 186, which in turn passes the data to an NDIS MAC interface layer 188. The shared memory virtual device driver 180 previously has registered with the IP layer 186 that it is able to reach a node associated with the destination IP address for the user application data. Accordingly, the IP layer uses the NDIS MAC layer interface 188 to invoke the driver interface to the shared memory virtual device driver 180. The shared memory virtual device driver 180 encapsulates the received data into a data frame prefixed with a shared memory MAC header 132 indicating the IP address of a node on the local shared memory network or the global shared memory network. The shared memory virtual device driver 180 passes the data frame to WinSock layer 182, which passes the data frame through TCP layer 184, IP layer 186, and NDIS MAC interface layer 188 to a physical layer 190. The physical layer 190 transmits data frames to memory bridge 68 or physical network adapter 72.

In the embodiment of FIG. 9, all normal Windows NT® server networking tools, such as the network monitor and the NCP, recognize the shared memory networks and function normally because all driver functions are supported and a MAC header is created. In addition, because a MAC header is constructed, Netbios and Netware should function normally over the local shared memory network. All normal Windows NT® server networking commands, such as ipconfig, route, and netstat, recognize the shared memory networks and function normally. User applications deal with the local and global shared memory networks in the same way that they would deal with other IP interfaces and addresses. Multiple shared memory virtual adapters may be installed on each of the device nodes 12–18. Each of the virtual adapters may be configured with its own unique IP address. The local shared memory network and the global shared memory network may be multihomed with unique MTU settings.

In other embodiments, the shared memory virtual adapters may be implemented in a UNIX-based execution environment. For example, the shared memory virtual adapters may be provided by a STREAMS mechanism, which is a feature of a UNIX-based system that provides a standard way of dynamically building and passing messages up and down a communications protocol stack.

Packet Routing Over the Local Shared Memory Network

In the above-described embodiments, each device node 12–18 may be addressed over the local shared memory network by a unique IP address. The local shared memory virtual adapters 172 use shared memory MAC header 132, which includes the node identifier that is embedded in the physical address, to avoid demultiplexing output packets. In particular, the shared memory MAC header 132 includes a special bit that is set to signal internal shared memory virtual device driver commands.

Normal Address Resolution Protocol (ARP) processing may be used to route packets over the local shared memory network. In particular, an ARP process may be used to map IP layer addresses (referred to herein as "IP addresses") to addresses that are used by the hardware link level and access protocols (referred to herein as "physical addresses" or "MAC addresses"). The ARP protocol layer in each device node 12–18 typically contains a table of mappings between IP addresses and physical addresses (referred to as the "ARP cache"). When a mapping between an IP address and the corresponding physical address is not known, the ARP protocol issues a broadcast packet (an "ARP request" packet) on the local shared memory network. The ARP request indicates an IP address for which a physical address is being requested. The ARP protocols in each device node 12–18 examine the ARP request, and if a device node recognizes the IP address indicated by the ARP request, it issues a response (an "ARP response" or "ARP reply" packet) to the requesting device node indicating the responder's physical address. The requesting ARP protocol reports the received physical address to the local IP layer, which then uses the received physical address to send datagrams directly to the responding device node.

Packet Routing Over the Global Shared Memory Network

In one embodiment, the global shared memory virtual adapters on each of the device nodes 12–18 are configured for an identical global IP address, which is read from the registry 86. In this way, network applications executing outside of network infrastructure service system 10 may address a set of the device nodes 12–18 using a single global IP address. Multiple global IP addresses may be assigned to one or more sets of the device nodes 12–18. Global IP addresses are visible to applications running on device nodes 12–18 and appear as normal network interfaces. Global IP addresses are not linked to any physical adapters. In TCP-based embodiments, the TCP registry entries for the global shared memory virtual adapters are modified to include an additional attribute of GLOBAL. In addition, the TCP/IP layer is modified so that any packet destined to a GLOBAL interface and not received from a GLOBAL interface is handed to a global shared memory virtual adapter for processing. Packets destined to a GLOBAL interface and received from a GLOBAL interface are passed up to the local TCP/IP protocol stack for processing. In UNIX-based embodiments, the ifconfig command may be used to set to GLOBAL flag on the interface.

Figure 10A:
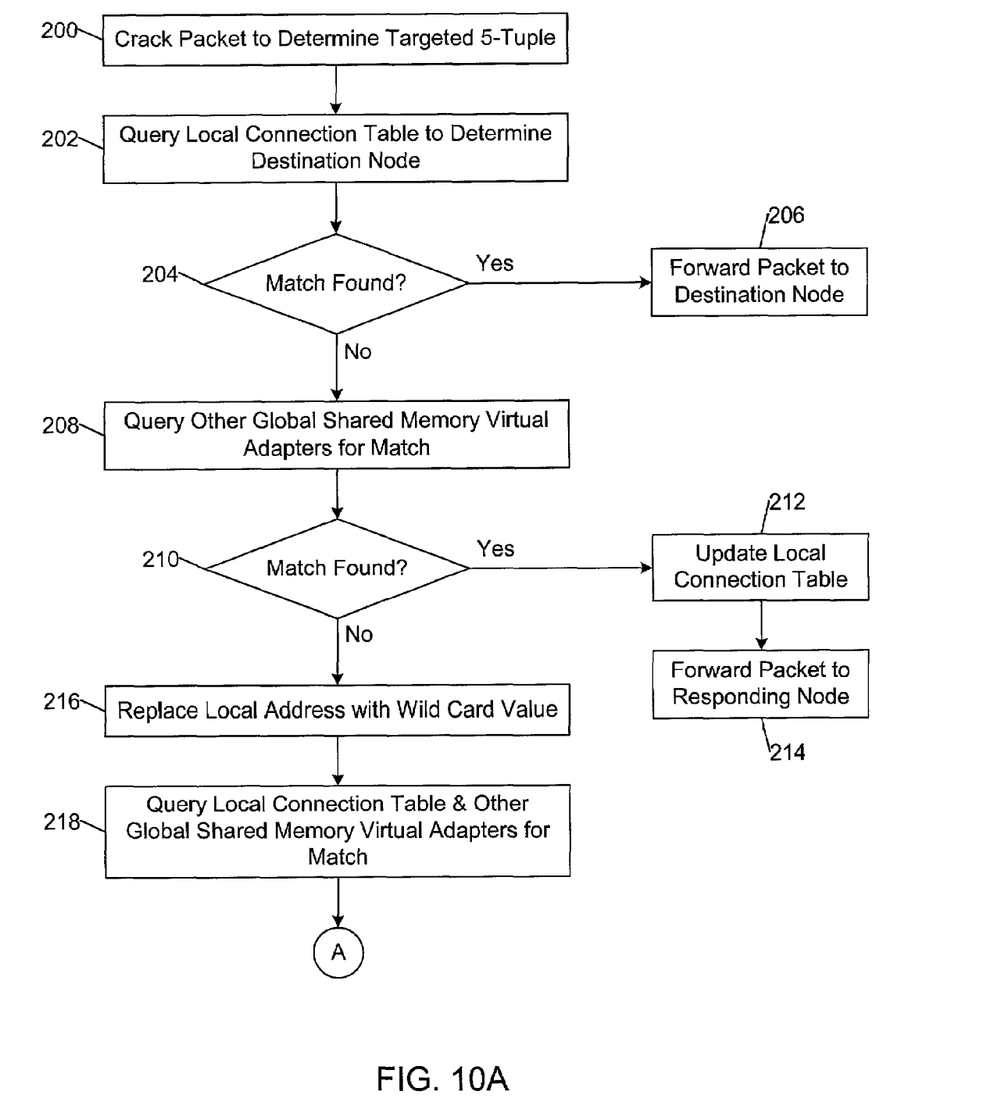
FIGS. 10A and 10B are flow diagrams of a method of routing packets over the global shared memory network of FIG. 1.
Figure 10B:
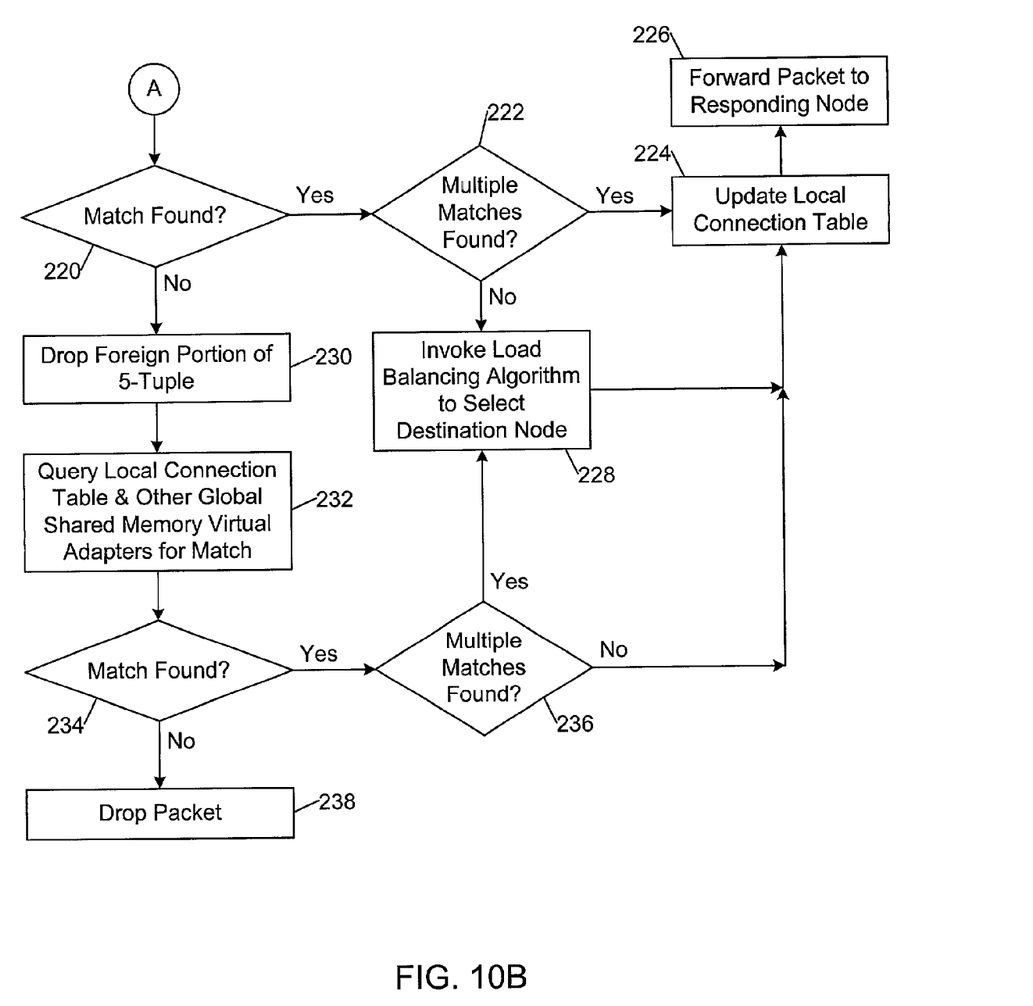

Referring to FIGS. 10A and 10B, the global shared memory virtual adapters may route packets over the global shared memory network, as follows. Initially, a globally addressed packet is cracked to determine its targeted 5-tuple (i.e., <protocol, local address, local port, foreign address, foreign port>), which fully specifies its TCP connections and UDP associations (step 200). Next, the transmitting global shared memory virtual adapter queries a local connection table to identify an exact match for the 5-tuple (step 202). The connection table contains a list of active (or pending) connections to the global shared memory network. In Windows NT®-based embodiments, the Windows NT® TCP/IP protocol stack may be queried to export the location of the open TCP and UDP ports. At initialization and periodically thereafter, the global shared memory virtual adapters walk the port connections to create and update the connection table entries. Garbage collection for the connection tables is triggered by a periodic timer. If an exact match for the 5-tuple is found (step 204), the globally addressed packet is forwarded to the matching node identified in the local connection table (step 206). Otherwise, the transmitting global shared memory virtual adapter queries the global shared memory virtual adapters on other nodes for an exact match (step 208). If another driver responds (step 210), the transmitting global shared memory virtual adapter updates the local connection table with the identifier <node, 5-tuple> (step 212) and forwards the globally addressed packet to the responding node (step 214).

If no exact match is found for the 5-tuple (step 210), the transmitting global shared memory virtual adapter replaces the local address of the 5-tuple with a wild card value (step 216) and queries the local connection table or the other global shared memory virtual adapters for a match (step 218). If a match is found (step 220) this would indicate a server waiting for a connection request on any connected network from a particular foreign address and port. If only one match is found (step 222), the transmitting global shared memory virtual adapter updates the local connection table (step 224) and forwards the globally address packet to the matching node (step 226). If multiple matches are found (step 222), this would indicate that the server has multiple instances executing within the system partition. In this case, the transmitting global shared memory virtual adapter invokes a load-balancing algorithm (e.g., a round robin load-balancing algorithm) to select a destination node (step 228). The transmitting global shared memory virtual adapter updates the local connection table to reflect this selection (step 224) and forwards the globally addressed packet to the selected node (step 226).

If no match is found at this point (step 220), the transmitting global shared memory virtual adapter drops the foreign portion of the 5-tuple entirely (step 230) and queries the local connection table or the other the global shared memory virtual adapters for a match (step 232). If a match is found (step 234), this would indicate a server waiting for a connection request on any connected network from any foreign address or port. If only one match is found (step 236), the transmitting global shared memory virtual adapter updates the local connection table (step 224) and forwards the globally address packet to the matching node (step 226). If multiple matches are found (step 236), this would indicate that the server has multiple instances executing within the system partition. In this case, the transmitting global shared memory virtual adapter invokes a load-balancing algorithm (e.g., a round robin load-balancing algorithm) to select a destination node (step 228). The transmitting global shared memory virtual adapter updates the local connection table to reflect this selection (step 224) and forwards the globally addressed packet to the selected node (step 226).

If no match is found for the globally addressed packet, the packet is dropped (step 238).

In one embodiment, the network infrastructure service system 10 is configured as an OSPF (Open Shortest Path First) area. In this embodiment, device nodes that have physical network adapters (referred to herein as "physically connected nodes") are configured as OSPF area border routers. OSPF cross area routing algorithms route first to the optimal area border router into or out of the targeted area. In particular, packets destined to remote nodes (referred to herein as "outbound packets") are routed first to device nodes that have physical network adapters. In one implementation, OSPF cost metrics are set so that the optimal route to the area border router is always over the local shared memory network. OSPF supports duplicate routes to the same area through alternate area border routers. To improve the availability of the global shared memory network, different nodes are installed with physical adapters and defined as area border routers into the system partition of the network infrastructure service system 10. In addition, alternate routes from remote global clients are established to each area border router. OSPF detects whenever a node fails, a physical network adapter fails, or a physical network interface changes state, and recovers by invoking an alternate route. OSPF also handles updating of the routing tables.

Systems and methods have been described herein in connection with a particular network infrastructure service system environment. These systems and methods, however, are not limited to any particular hardware or software configuration, but rather they may be implemented in any shared memory network infrastructure service computing or processing environment, including a global shared memory environment, a distributed shared memory environment, or a logically shared memory environment. In general, the component systems of the shared memory virtual adapters may be implemented, in part, in a computer process product tangibly embodied in a machine-readable storage device for execution by a computer processor. In some embodiments, these systems preferably are implemented in a high level procedural or object oriented processing language; however, the algorithms may be implemented in assembly or machine language, if desired. In any case, the processing language may be a compiled or interpreted language. The methods described herein may be performed by a computer processor executing instructions organized, for example, into process modules to carry out these methods by operating on input data and generating output. Suitable processors include, for example, both general and special purpose microprocessors. Generally, a processor receives instructions and data from a read-only memory and/or a random access memory. Storage devices suitable for tangibly embodying computer process instructions include all forms of non-volatile memory, including, for example, semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially designed ASICs (application-specific integrated circuits).

Other embodiments are within the scope of the claims.

What is claimed is:

1. A system providing network infrastructure services, comprising a shared memory facility interconnecting a plurality of network devices each configured to perform a dedicated network infrastructure function, wherein each network device is configurable and comprises:
a local processor;
a local memory;
a local communications protocol stack; and
a shared memory interface system operable to provide a local shared memory network between the network devices, and a global shared memory network between the network devices and one or more remote nodes by capturing packets from the local communications protocol stacks and routing the captured packets over the shared memory facility,
wherein the shared memory interface system on each local node comprises a local shared memory virtual adapter and a global shared memory virtual adapter;
the local shared memory virtual adapters being operable to capture locally addressed packets from the local communications protocol stacks and to route the captured packets for physical transport over the shared memory facility; and the global shared memory virtual adapters being operable to capture globally addressed packets from the local communications protocol stacks and to route the captured packets for physical transport over the shared memory facility.

2. The system of claim 1, wherein the local shared memory virtual adapters appear to the local communications protocol stacks as device drivers for physical network adapters connected to the local shared memory network, and the global shared memory virtual adapters appear to the local communications protocol stacks as device drivers for physical network adapters connected to the global shared memory network.

3. The system of claim 1, wherein the local shared memory network and the global shared memory network provided by the shared memory interface system are each characterized by a respective configurable maximum transfer unit (MTU).

* * * * *

UNITED STATES PATENT AND TRADEMARK OFFICE
CERTIFICATE OF CORRECTION

| | | |
|---|---|---|
| PATENT NO. | : 6,999,998 B2 | Page 1 of 1 |
| APPLICATION NO. | : 09/971135 | |
| DATED | : February 14, 2006 | |
| INVENTOR(S) | : Lance W. Russell | |

It is certified that error appears in the above-identified patent and that said Letters Patent is hereby corrected as shown below:

In column 16, line 62, in Claim 1, after "facility" delete "," and insert -- ; --, therefor.

Signed and Sealed this

Second Day of June, 2009

JOHN DOLL
*Acting Director of the United States Patent and Trademark Office*